United States Patent
Prakash et al.

(10) Patent No.: US 7,983,984 B2
(45) Date of Patent: *Jul. 19, 2011

(54) ELECTRONIC ENDORSEMENT OF CHECK IMAGES

(75) Inventors: Ravinder Prakash, Concord, NC (US);
Rodney G. Moon, Charlotte, NC (US);
Gerald C. Rector, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/821,462

(22) Filed: Jun. 23, 2010

(65) Prior Publication Data
US 2010/0260408 A1    Oct. 14, 2010

Related U.S. Application Data

(63) Continuation of application No. 11/383,851, filed on May 17, 2006, now Pat. No. 7,818,245.

(51) Int. Cl.
*G06Q 40/00* (2006.01)
(52) U.S. Cl. .......................................... 705/37; 705/38
(58) Field of Classification Search ............... 705/37–38
See application file for complete search history.

(56) References Cited

U.S. PATENT DOCUMENTS

| | | | |
|---|---|---|---|
| 4,210,346 A | 7/1980 | Mowry, Jr. et al. | |
| 4,731,524 A | 3/1988 | Brooks | |
| 5,182,991 A | 2/1993 | Patuszynski et al. | |
| 5,838,814 A | 11/1998 | Moore | |
| 2002/0084321 A1 | 7/2002 | Martens et al. | |
| 2003/0038974 A1 | 2/2003 | Hu | |
| 2004/0260636 A1* | 12/2004 | Marceau et al. | 705/35 |
| 2006/0280331 A1 | 12/2006 | Chosson et al. | |
| 2007/0140545 A1 | 6/2007 | Rossignoli | |

OTHER PUBLICATIONS

China IP Law, "IDS", Apr. 24, 2009, 1 page.
Prakash et al., U.S. Appl. No. 11/383,851, Notice of Allowance and Fees Due, Jun. 9, 2010, 7 pages.
Prakash et al., U.S. Appl. No. 11/383,851, Office Action Communication, Dec. 2, 2009, 8 pages.
Prakash et al., U.S. Appl. No. 11/383,851, Office Action Communication, Apr. 15, 2009, 9 pages.
Prakash et al., U.S. Appl. No. 11/383,851, Office Action Communication, Oct. 3, 2008, 7 pages.
Prakash et al., U.S. Appl. No. 11/383,851, Office Action Communication, Apr. 4, 2008, 19 pages.

* cited by examiner

*Primary Examiner* — Thu Thao Havan
(74) *Attorney, Agent, or Firm* — Douglas Lashmit; Hoffman Warnick LLC

(57) ABSTRACT

A system and method for applying an endorsement to an electronic image of a bank check. A system is described that includes: an imaging system for generating an endorsement image representing an action taken relative to processing the bank check; a halftone system for converting the endorsement image into a digitally halftoned endorsement image; and a positioning system for placing the digitally halftoned endorsement image onto the electronic image of the bank check.

20 Claims, 3 Drawing Sheets

ELECTRONIC ENDORSEMENT OF CHECK IMAGES

REFERENCE TO PRIOR APPLICATIONS

The current application is a continuation application of U.S. Utility application Ser. No. 11/383,851, which was filed on May 17, 2006, which is hereby incorporated by reference.

FIELD OF THE INVENTION

The invention relates generally to processing electronic check images, and more particularly, to a system and method for providing electronic endorsement of check images using digital halftones.

BACKGROUND OF THE INVENTION

With the passage of the Check 21 Act ("Check21"), financial institutions are now able to electronically process transactions based on check images. Before Check21, banks would physically endorse checks with a stamp as a means for recording the processing of the check, e.g., when it cleared, the bank name, etc. With the advent of electronic images, however, banks have limited ability to physically stamp or endorse checks since many checks are being presented as electronic images. Nonetheless, from an operational standpoint, banks would still prefer to endorse checks either physically or electronically.

Currently, the banking industry has adopted black white images, as opposed to grayscale or color, as the standard for image based check processing. One of the inherent problems with attempting to electronically endorse a black white check image is that there is a risk of obscuring or overwriting the image information present on the check image. This same problem would likewise exist if the banking industry adopted the use of grayscale, color or other bitonal images for check processing.

Accordingly, a need exists for a system and method that can provide a soft endorsement on check images without damaging the information on the check images.

SUMMARY OF THE INVENTION

The present invention addresses the above-mentioned problems, as well as others, by providing a system and method for providing a soft endorsement on check images using digital halftones such that the information on the check images is not damaged.

In a first aspect, the invention provides an electronic endorsement system for applying an endorsement to an electronic image of a bank check, comprising: an imaging system for generating an endorsement image representing an action taken relative to processing the bank check; a halftone system for converting the endorsement image into a digitally halftoned endorsement image; and a positioning system for placing the digitally halftoned endorsement image onto the electronic image of the bank check.

In a second aspect, the invention provides a computer program product stored on a computer readable medium for applying an endorsement to an electronic image of a bank check, comprising: program code configured for generating an endorsement image representing an action taken relative to processing the bank check; program code configured for converting the endorsement image into a digitally halftoned endorsement image; and program code configured for placing the digitally halftoned endorsement image onto the electronic image of the bank check.

In a third aspect, the invention provides a method of applying an endorsement to an electronic image of a bank check, comprising: generating an endorsement image representing an action taken relative to processing the bank check; converting the endorsement image into a digitally halftoned endorsement image; and placing the digitally halftoned endorsement image onto the electronic image of the bank check.

In a fourth aspect, the invention provides a method for deploying a system for applying an endorsement to an electronic image of a bank check, comprising: providing a computer infrastructure being operable to: generate an endorsement image representing an action taken relative to processing the bank check; convert the endorsement image into a digitally halftoned endorsement image; and place the digitally halftoned endorsement image onto the electronic image of the bank check.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
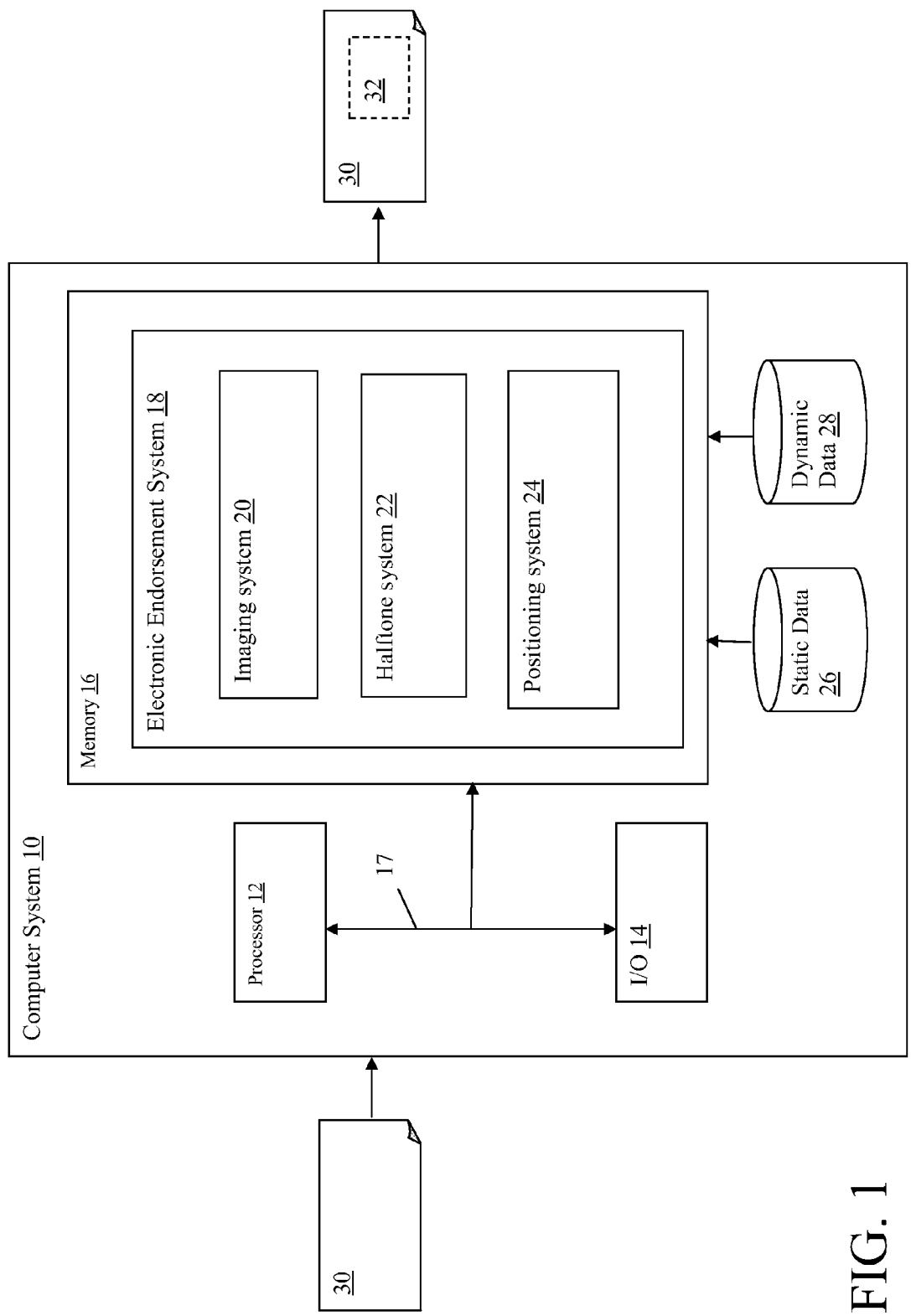
FIG. 1 depicts a system for providing a soft endorsement of a check image in accordance with an embodiment of the present invention.

Referring now to drawings, FIG. 1 depicts a computer system 10 having an electronic endorsement system 18 for adding a digital halftone endorsement 32 to an inputted electronic check image 30. Electronic endorsement system 18 includes an imaging system 20 for generating an electronic endorsement, a halftone system 22 for creating a halftone image 32 of the electronic endorsement, and a positioning system 24 for positioning the halftone image 32 on the check image 30. Note that while the illustrative embodiments described herein disclose a system that processes a black white image 30, the invention is applicable to any type of electronic check image, including color, grayscale and other bitonal representations.

In one illustrative embodiment, imaging system 20 generates an endorsement image by incorporating both static data 26 and dynamic data 28. Static data 26 comprises any type of information that is stable from check to check, e.g., a bank's name, logos, notations such "cleared," "returned," etc. Dynamic data 28 comprises any type of information that may vary from check to check, e.g., a date, an amount, a sequence number, etc. Any now known or later developed system for generating an endorsement image may be utilized. For instance, the endorsement image may be generated as a black white bitmap image, a color image, etc.

Halftone system 22 converts the endorsement image into a halftone image 32 suitable for placement onto check image 30. Halftone system 22 can likewise be implemented in any manner. As is known in the art, a halftone image 32 is made up of a series of dots rather than a continuous tone. These dots can be different sizes, different colors, and sometimes even different shapes. Larger dots are used to represent darker, denser areas of the image, while smaller dots are used for lighter areas. As long as the resolution of the image is high enough, the dots appear as a continuous image to the human eye.

Positioning system 24 provides a system for positioning the halftone image 32 (i.e., endorsement) onto the check image 30. For instance, positioning system 24 may place the halftone image 32 at a determined location (e.g., in the center), at a determined skew angle, at a determined size, etc. Positioning may be done using predetermined settings, or determined dynamically, e.g., based on a software routine that analyzes information on the check.

Figure 2:
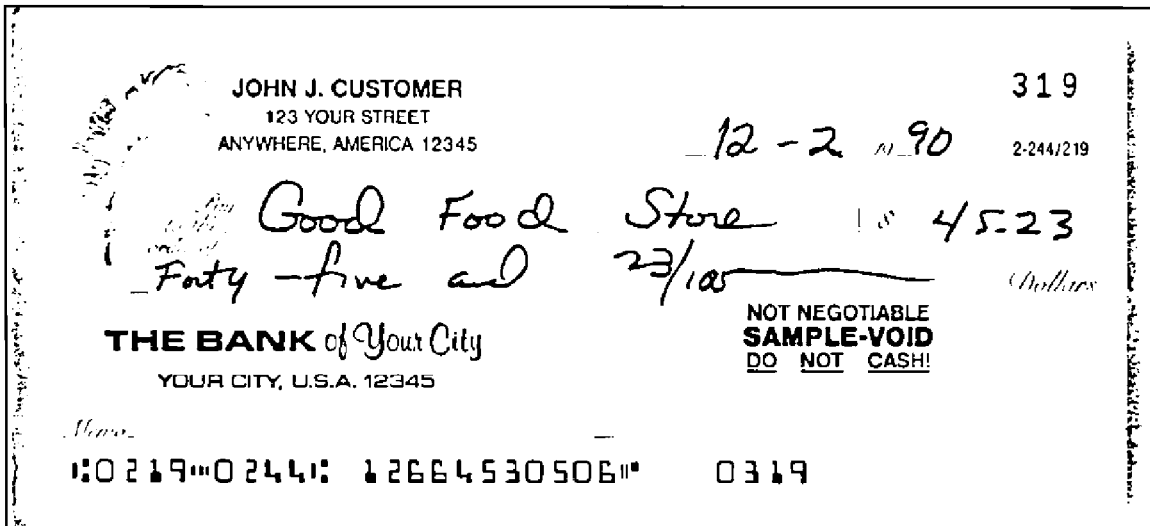
FIG. 2 depicts a black white check image.

Referring now to FIG. 2, a black white check image 40 is shown. As noted above, the traditional method of endorsing a check is to stamp it with color ink. Such endorsements offer the ability to overwrite without obscuring the original information. However, in electronic images, such as the one shown, overwriting with a bitmap can obscure and risk altering the original information.

Figure 3:
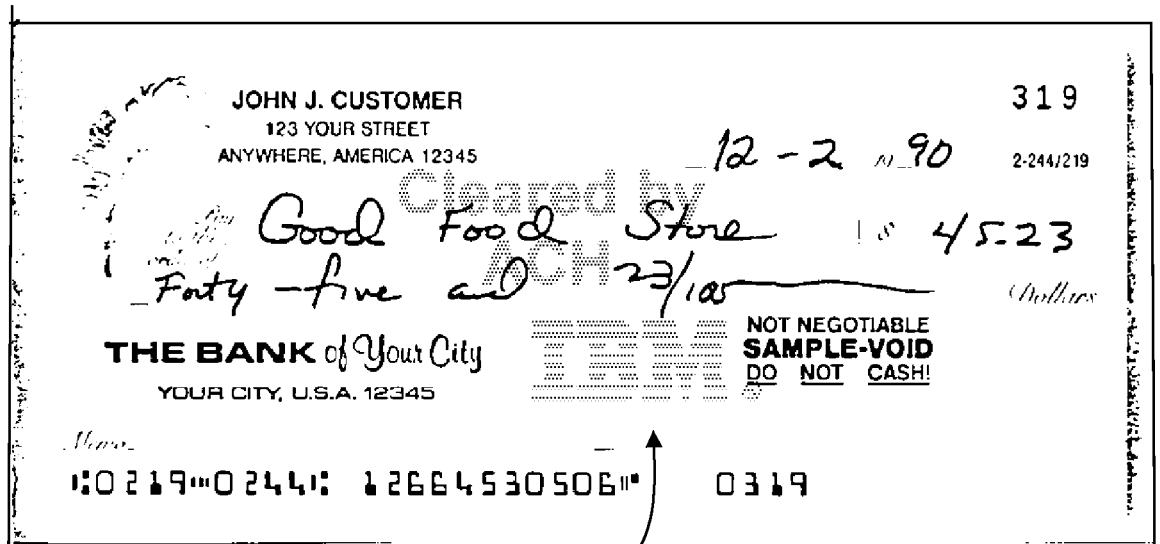
FIG. 3 depicts a black white check image with an endorsement generated on the image in accordance with an embodiment of the present invention.

FIG. 3 depicts the check image 40 of FIG. 2, in which the digital halftone endorsement 42 has been added. In this example, a 50% grayscale has been utilized for the halftone endorsement 42. As can be seen, the information on the check image 40 is not obscured or overwritten by the halftone endorsement 42.

Figure 4:
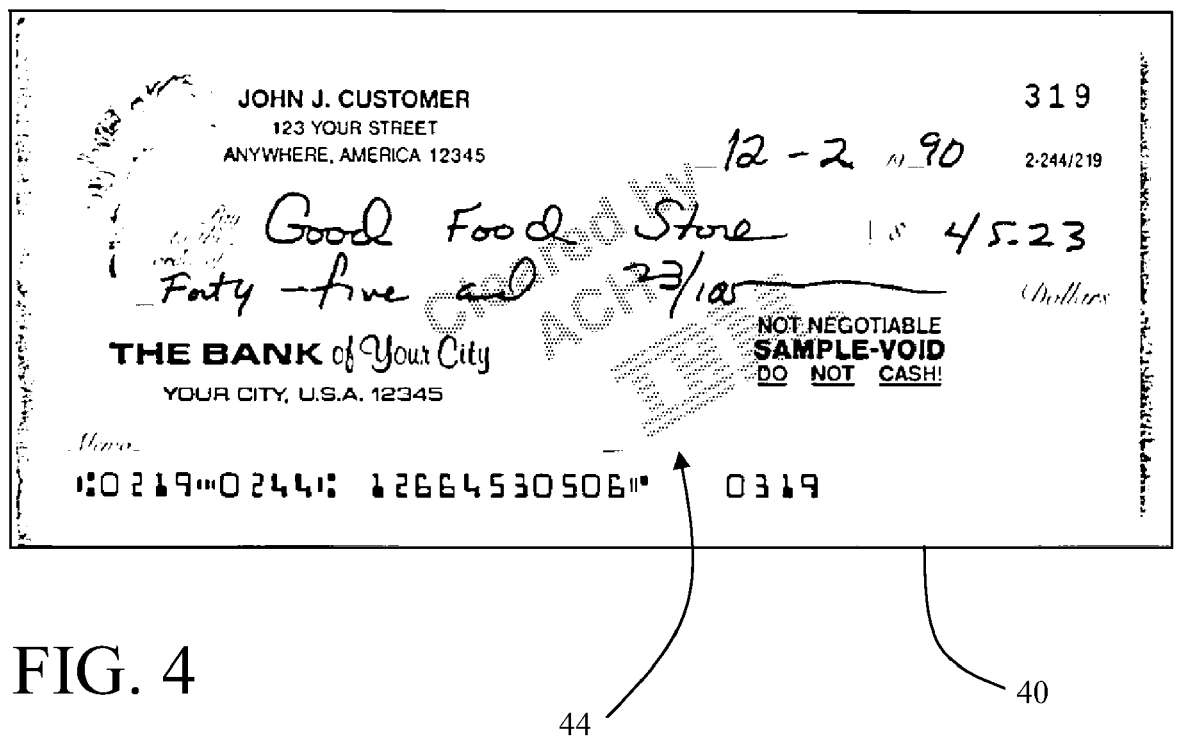
FIG. 4 depicts a variation of an endorsement generated on a check image in accordance with an embodiment of the present invention.

FIG. 4 depicts a further variation in which positioning system 24 (FIG. 1) has inclined or skewed the halftone endorsement 44 by 30 degrees in order to improve endorsement readability. In addition, the halftone endorsement 44 is implemented with a grayscale level of 25%. Obviously, the specific positioning, amount of grayscale, amount of rotation, and size used for the digitally generated halftone endorsement can vary without departing from the scope of the invention. Moreover, these features could be set to a predetermined level, or determined dynamically, e.g., based on information collected from the check itself. Thus, electronic endorsement system 18 could set the grayscale level, skew angle, position and size of the electronic endorsement 44 on a check by check basis in order to maximize the readability of both the endorsement and underlying information on the check image. For instance, the electronic endorsement could be positioned to overlap a minimum amount of data in the check.

In general, computer system 10 (FIG. 1) may comprise any type of computing device, and could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising an electronic endorsement system 18 could be created, maintained and/or deployed by a service provider that offers the functions described herein for customers. That is, a service provider could offer to provide halftone endorsements to check images as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computer system comprising:
a system for applying an endorsement to an electronic image of a bank check, by performing a method comprising:
generating an endorsement image representing an action taken relative to processing the bank check, wherein the endorsement image is separate from the electronic image of the bank check;
converting the endorsement image into a digitally halftoned endorsement image; and
placing the digitally halftoned endorsement image onto the electronic image of the bank check.

2. The computer system of claim 1, wherein the endorsement image is generated as a bitmap image.

3. The computer system of claim 1, wherein the imaging system generates the endorsement image from static data and dynamic data.

4. The computer system of claim 3,
wherein the static data comprises image data selected from the group consisting of: text, logos, and processing notations; and
wherein the dynamic data comprises image data selected from the group consisting of: a date, a time, an amount, and a reference number.

5. The computer system of claim 1, wherein the halftone system generates the digitally halftoned endorsement image at a predetermined or dynamically determined grayscale level.

6. The computer system of claim 1, wherein the positioning system places the digitally halftoned endorsement image onto the electronic image of the bank check at a predetermined or dynamically determined skew angle.

7. The computer system of claim 1, wherein the electronic image of the bank check comprises a format selected from the group consisting of: black white, bitonal, color and grayscale.

8. A computer program product stored on a computer readable storage medium for applying an endorsement to an electronic image of a bank check, the computer program product including program code, which when executed, causes a computer system to perform a method comprising:
generating an endorsement image representing an action taken relative to processing the bank check, wherein the endorsement image is separate from the electronic image of the bank check;
converting the endorsement image into a digitally halftoned endorsement image; and
placing the digitally halftoned endorsement image onto the electronic image of the bank check.

9. The computer program product of claim 8, wherein the endorsement image is generated as a bitmap image.

10. The computer program product of claim 8, wherein the endorsement image is generated by combining static data and dynamic data.

11. The computer program product of claim 10,
wherein the static data comprises image data selected from the group consisting of: text, logos, and processing notations; and
wherein the dynamic data comprises image data selected from the group consisting of: a date, a time, an amount, and a reference number.

12. The computer program product of claim 8, wherein the digitally halftoned endorsement image is generated at either a predetermined or dynamically determined grayscale level.

13. The computer program product of claim 8, wherein the digitally halftoned endorsement image is placed onto the electronic image of the bank check at either a predetermined or dynamically determined skew angle.

14. The computer program product of claim 8, wherein the electronic image of the bank check comprises a format selected from the group consisting of: black white, bitonal, color and grayscale.

15. A method of configuring a computer system to apply an endorsement to an electronic image of a bank check, the method comprising:
encoding program code stored on a non-transitory computer readable medium of a source computer system into a set of data signals; and
providing the set of data signals for use on a destination computer system distinct from the source computer system, wherein, when executed, the program code causes the destination computer system to perform a method comprising:
generating an endorsement image representing an action taken relative to processing the bank check, wherein the endorsement image is separate from the electronic image of the bank check;
converting the endorsement image into a digitally halftoned endorsement image; and
placing the digitally halftoned endorsement image onto the electronic image of the bank check.

16. The method of 15, wherein the endorsement image is generated by combining static data and dynamic data.

17. The method of claim 16, wherein the static data comprises image data selected from the group consisting of: text, logos, and processing notations, and wherein the dynamic data comprises image data selected from the group consisting of: a date, a time, an amount, and a reference number.

18. The method of claim 15, wherein the digitally halftoned endorsement image is generated at either a predetermined or dynamically determined grayscale level.

19. The method of claim 15, wherein the digitally halftoned endorsement image is placed onto the electronic image of the bank check at either a predetermined or dynamically determined skew angle.

20. The method of claim 15, wherein the electronic image of the bank check comprises a format selected from the group consisting of: black white, bitonal, color and grayscale.

* * * * *